Dec. 16, 1941.   R. STOVER   2,266,093
METHOD OF CONVERTING EDIBLE COMPOSITIONS
Original Filed June 10, 1938   2 Sheets-Sheet 1

INVENTOR.
RUSSELL STOVER.
BY
ATTORNEY

Dec. 16, 1941.    R. STOVER    2,266,093
METHOD OF CONVERTING EDIBLE COMPOSITIONS
Original Filed June 10, 1938    2 Sheets-Sheet 2
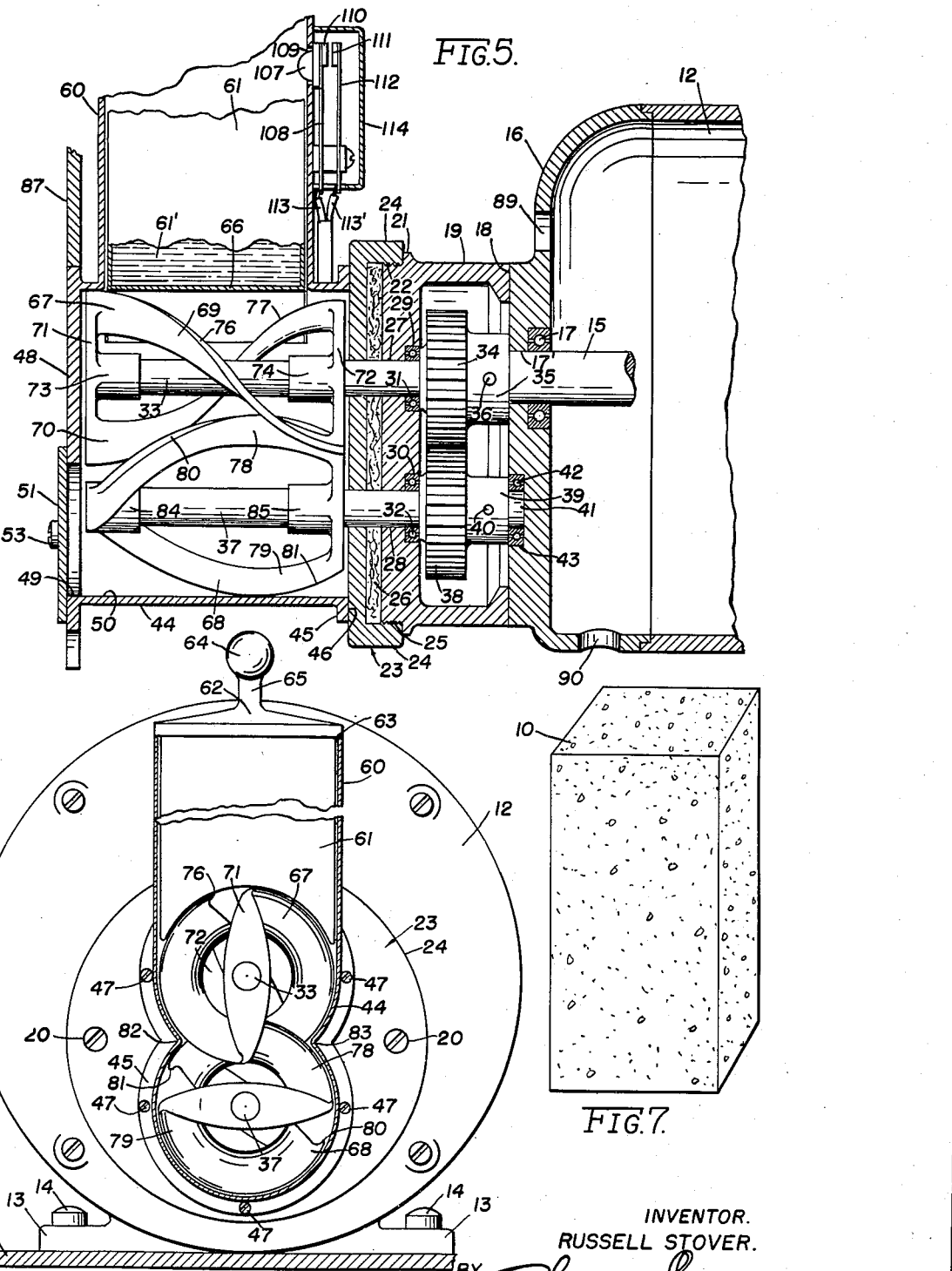
INVENTOR.
RUSSELL STOVER.
BY
ATTORNEY.

Patented Dec. 16, 1941

2,266,093

UNITED STATES PATENT OFFICE 2,266,093

METHOD OF CONVERTING EDIBLE COMPOSITIONS

Russell Stover, Kansas City, Mo.

Original application June 10, 1938, Serial No. 212,913. Divided and this application May 29, 1939, Serial No. 276,405

8 Claims. (Cl. 107—54)

This invention relates to a method of converting edible compositions into a more delectable state and more especially to convert solidified substances into a plastic mass of predetermined consistency, although certain features thereof may be employed with equal advantage for kindred purposes. This application is a division of patent application serially numbered 212,913 filed June 10, 1938, of which application serially numbered 381,726 filed March 4, 1941, is a continuation-in-part.

It contemplates more especially the provision of improved means for changing the texture of normally liquid compositions frozen to a substantially solid state of predetermined volume or mass to convert such to a delectable plastic consistency possessed of improved taste characteristics so as to be vendible over the counter in pre-measured quantities or units for consumption with a spoon or other utensil in substantially the same state and substantially at the same temperature as ice cream discharged direct from the customary batch freezer.

With the teachings of the present invention, the problems of pre-measuring as well as converting frozen or refrigerated drinks of a composite character are easily solved without entailing any appreciable care, time measuring variables or impairment due to non-uniformity in the resulting composition for prompt vending to the consumer over the counter. These difficulties are especially eliminated by starting out with a pre-measured composition of a normally liquid substance frozen to a substantially solid state preferably though not essentially with a predetermined air overrun therein and effecting the conversion thereof into a flowable plastic mass promptly upon order and without impairment to the constituents, taste characteristics, texture, or the desirable overrun usually imparted to products of this character for commercial as well as improved taste purposes.

Then, too, frozen products are preferably provided with an overrun ranging from seventy to eighty per cent for the best eating qualities depending upon the dictates of commercial practice and the processing thereof for conversion into a flowable or plastic mass and consummable with the aid of the customary utensils such as a spoon. Such conversion should not diminish the initial overrun and, may, if desired, increase the overrun to produce commercial as well as taste advantages. Should the initial overrun be too low in the frozen product, then the conversion treatment could impart the desired overrun thereto so that the final product is possessed of uniform specifications as to texture, volume, overrun, and consistency without any degree of control exercised by the attendant. However, should the initial overrun exceed the range of seventy to eighty per cent or any other desired limit, the conversion treatment may be utilized to diminish the air overrun to obtain the most delectable texture and consistency in the final product.

The usual disadvantages have been overcome largely by producing large batches of a normally liquid composition on a production basis and converting such to a substantially solid state by simultaneous beating and freezing in order to impart thereto an air overrun preferably though not essentially ranging from fifty to one hundred per cent and retaining such during the conversion thereof into a substantially plastic state with predeterminable overrun depending upon the dictates of commercial practice. The normally liquid composition is rendered self-sustaining and form-retaining in predetermined units sufficient for instantly preparing an individual order over the counter. To this end, the factory produced units of a frozen edible composition are held at a definite hardness and rendered available in storage compartments of mechanical coolers for counter conversion into a substantially plastic mass of predetermined volume having substantially the same temperature and consistency of the usual ice cream freeze as it leaves the customary batch freezer, this being accomplished without refrigeration in a converter embodying features and the teachings of the present invention.

The consumer will, therefore, receive a more palatable composition that is substantially 18° warmer in temperature than hardened ice cream ordinarily served at the fountain. The usual head discomfort experienced by some people during the consumption of hard ice cream or fountain served ice cream is usually eliminated. This is accomplished with a fountain counter machine that speedily converts the refrigerated mass into a substantially semi-solid plastic having substantially the same consistency and temperature of ice cream that is discharged from a batch or continuous freezer without the required addition or incorporation of liquids such as milk. Then, too, different flavors of pre-measured units can be successively processed in this manner with utmost flexibility depending upon the desires of each customer, since conversion chamber is self-emptying with each operation.

After conversion, the plastic edible composition is discharged into a receptacle such as a glass for consumption with the aid of a spoon or other utensil. The treatment of edible compositions having preferably a much lower butter fat content than ice cream, in such a manner, results in a composition which is uniform in quality, consistency and quantity on a factory produced and tested basis which precludes each individual vendor from incorporating any variations as well as eliminates the necessity of relying upon attendants to measure and exercise care with each order so as to procure such standards to a certainty, thereby controlling quality, quantity, texture and volume to a factory prescribed standard without injecting human inaccuracies. As a result, frozen edible compositions of this character having preferably though not essentially a much lower butter fat content than ice cream, can be served more economically and with utmost uniformity in composition, consistency, flavor quality and quantity without incorporating the elements of chance that are interposed by each attendant without detection.

This affords the national marketing of cold refrigerated compositions of much lower butter fat content than ice cream and yet having a smooth plastic consistency and the taste characteristics thereof as it normally leaves the batch ice cream freezer. This affords speedy serving of uniform quantities in an improved manner at less expense to the consumer and controlled cost to the vendor in predetermined quantities for each order without possible surplus or waste and with utmost uniformity in every possible respect. All of the disadvantages of vending drinks in a liquid state have been overcome with the teachings of the instant invention pertaining to a novel method of converting edible frozen compositions to a substantially plastic state having the consistency and substantially the temperature of ice cream at the time such leaves the standard freezer together with the taste characteristics thereof at less initial ingredient cost and without the uncontrollable loss now experienced because of waste. This is accomplished by a counter attendant with special composition conversion equipment that does not entail much time, labor, an expensive machinery investment, and the heretofore uncontrolled expense occasioned by waste and variation in the initial compounding by the counter attendant.

One object of the present invention is to provide a novel method of preparing predetermined servings of a normally liquid uniform edible composition in a substantially semi-solid or plastic chilled state.

Another object is to provide a novel method of instantly producing individual servings of a substantially plastic edible refrigerated substance of normally unstable ingredients combined in a composite product that has improved taste and eating characteristics.

Still another object is to provide a novel method of converting and producing normally liquid edible compositions in the form of a substantially plastic edible freeze possessed of a predetermined overrun.

A further object is to provide a novel method of converting composite refrigerated products of low butter fat content into predetermined servings of chilled plastic substances having the taste and texture characteristics of freshly prepared ice cream coming direct from a batch freezer.

A still further object is to provide improved frozen substance processing method of producing or maintaining the prepared overrun in a normally liquid composite material refrigerated to a substantially plastic state preparatory to consumption.

Still a further object is to convert a normally liquid composite edible substance frozen to a substantially solid state into a plastic consistency without incorporating a liquid during the conversion preparatory to consumption with the aid of a spoon or other utensil without impairment to its initial overrun.

An additional object is to provide a novel method of converting a substantially solid refrigerated mass into a plastic consistency without impairment to the initial overrun therein and producing a pre-measured uniform mass of an edible composition.

Other objects and advantages will appear from the following description of an illustrative embodiment of the present invention.

In the drawings:

Figure 5 is a fragmentary sectional view taken substantially along line V—V of Figure 3.

Figure 6 is a sectional view taken substantially along line VI—VI of Figure 2.

Figure 7 is a perspective view of a normally liquid edible composition plasticized to a substantially solid state for instant conversion into a semi-solid plastic flowable composite mass with the aid of the instrumentalities shown in the preceding figures.

Figure 1:
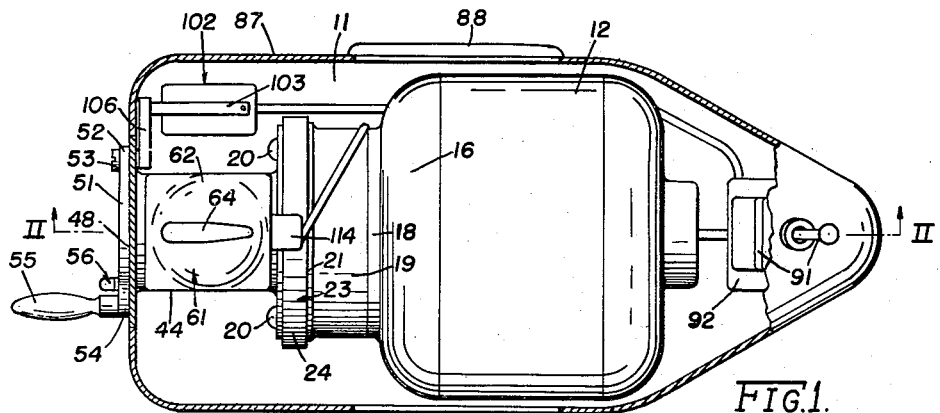
Figure 1 is a plan view of a device embodying features of the present invention, the external housing being shown in section to clarify the showing.
Figure 2:
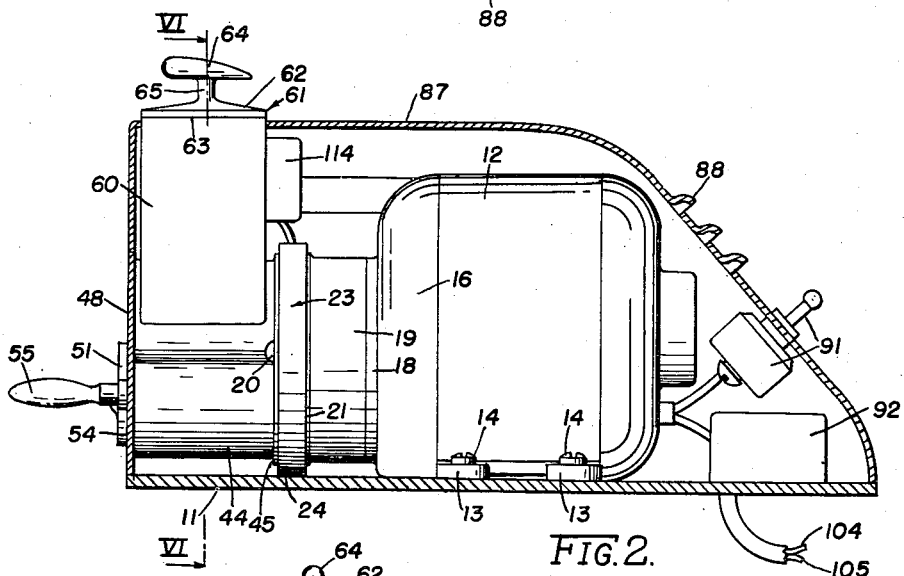
Figure 2 is a sectional view in elevation taken substantially along the line II—II of Figure 1.

The structure selected for illustration exemplifies a novel process of producing a normally untable product consisting of a composite association of different edible ingredients in predetermined relation to present a frozen self-sustaining and form-retaining edible composition capable of rapid conversion into a predetermined quantity of a flowable plastic mass for consumption with the aid of a spoon or similar utensil. An edible composition capable of advantageous conversion in accordance with the teachings of the present invention, preferably though not essentially may for purposes of illustration comprise suitable proportions of 20% butter fat cream, 4% butter fat milk, skim milk powder, corn sugar, beet or cane sugar, daroloid, and vanilla, chocolate syrup malted milk powder, or fruit intimately combined to provide a normally liquid composition capable of freezing into a substantially solid state.

Higher and lower butter fat compositions may also be treated and processed according to the teachings of the present invention, and other edible compositions varying greatly in constituents and proportional quantities may be utilized for this purpose. The above specified compositions should be regarded as illustrative rather than as an essential requirement of the composition for processing in accordance with the teachings of the invention which constitutes the subject matter of this disclosure. Then, too, a substantial or nominal portion of dry malted milk powder may be incorporated into the initial composition, especially when chocolate flavored, to present or impart thereto the accustomed chocolate malted milk taste preferably in the presence of the chocolate syrup or vanilla syrup flavor or even without these ingredients should commercial practice so dictate. This will depend largely upon the dictates of commercial practice and the individual tastes so that the above compositions are illustrative rather than limitations or requirements.

The ingredients are thoroughly mixed in much the same way as for the preparation of an ice cream mix; however, the compositions may be possessed of ½ to ⅓ of the usual butter fat content thereof to provide a composition of less calorific value and still be capable of effective counter conversion into a delectable product. Then, too, standard ice cream mix may also be used in processing in accordance with the teachings of the present invention. Thereupon, the unfrozen initial mixture is converted into a substantially plastic state by resort to the customary ice cream freezers which are capable of imparting thereto an air overrun ranging from fifty to one-hundred per cent or more as may be desired. This step converts their state from a liquid to a plastic or solid substance depending upon the degree of refrigeration to which it is subjected. For that matter, the initially refrigerated substance or mass need not possess any air overrun for purposes of conversion in accordance with the teachings of the method which is the subject matter of the present invention.

The resulting frozen flowable substance is poured or packaged or otherwise incorporated into suitable container molds to impart thereto a predetermined mass formation either directly into cylindrical units or small rectangular bars 10 (Figure 7) or into large masses that are hardened by subjection to low freezing temperatures over an extended period of time so as to enable cutting thereof into a plurality of small bars 10 approximating that shown in Figure 7. Usually, a battery of circular saws spaced apart for sufficient distance to sever the large mass of frozen material into a plurality of smaller bars 10, has been found to be a very efficient method of producing frozen bars which are pre-measured in volume to provide a glassful of the resulting product in a manner to be described hereinafter; however, the predetermined units may take a cylindrical shape and be prepared in an entirely different manner by pouring the plastic freeze into elongated paper containers serving as molds such as disclosed in my copending patent application Serial Number 212,916 and filed June 10, 1938.

The normally liquid mixture is thus subjected to refrigeration for conversion into self-sustaining and form-retaining units or bars 10 of predetermined size and shape with the desired overrun that ranges between fifty to one hundred per cent or more and in practice should average seventy per cent for the best taste results. Thus, the mixture is first converted into predetermined self-sustaining and form-retaining edible units 10 suitably packed in cartons. These cartons are delivered to vendors in the presence of dry ice or other refrigerants so as to maintain the self-sustaining and form-retaining consistency of the edible units 10 and to enable the vendor to convert each bar or unit 10 into a more desirable state such as a flowable plastic mass that is discharged into a receptacle such as a glass for vending over the counter and immediate consumption with the aid of a utensil such as a spoon.

The size, density and shape of the initial edible self-sustaining and form-retaining frozen mass 10 may vary depending upon the dictates of commercial practice, and are delivered to vendors who are usually equipped with mechanically refrigerated storage cabinets which will maintain the bars or edible units 10 at the desired freezing temperature and solid consistency desired over an extended period of time in readiness for conversion upon order by a consumer. The edible self-sustaining and form-retaining bars 10 of predetermined size and form are then converted into a delectable flowable plastic mass having a pleasing temperature preferably though not essentially approximating 23° F. upon order of the consumer who intends to consume such in the form of a soft flowable freeze at the counter with the aid of a spoon.

To this end, a specially efficacious converting device embodying features of the present invention, is provided on the counter for this particular purpose so as to speedily convert the pre-measured size or volume of self-sustaining and form-retaining units such as the bars 10 into a predetermined quantity of a plastic flowable mass without impairing the overrun that is initially provided therein or adjusting the overrun should commercial practice so dictate to improve the texture, taste and flavor for consumption with the aid of a utensil such as a spoon.

The preferred embodiment of a machine embodying features of the present invention and capable of performing the method of converting normally liquid substances frozen to a substantially solid state into a flowable plastic mass possessed of the desired overrun in accordance with the teachings of the present invention, may comprise a base 11 preferably consisting of a flat plate member which serves to sustain a full load quick starting electric torque type motor 12. The electric motor 12 is, in this instance, provided with base flanges 13 that are perforated to receive threaded studs 14 therethrough to securely mount the motor 12 to the base 11. The motor 12 is preferably of the self-starting torque type which starts off at full speed approximating 1750 R. P. M. As shown, the motor 12 has an armature shaft 15 extending through the forward motor casing plate 16 which is provided with a bearing 17 for journalled support of the armature shaft 15. The bearing 17 is disposed concentrically of the armature shaft bore 17' provided in the forward wall 18 of the motor casing end plate 16.

The forward casing plate 16 of the motor 12 is preferably provided with an outwardly extending circular boss 18 that serves as a complement of a cylindrical gear housing 19 of corresponding size for axial attachment thereto by means of suitable fasteners such as stud bolts 20. In order to preclude oil and other foreign substances from escaping beyond the gear housing 19, the forward peripheral edge 21 is threaded as at 22 to receive a retainer plate 23 thereover. To this end, the packing retainer plate 23 is provided with a peripheral flange 24 that is inwardly threaded as at 25 to engage the correspondingly threaded peripheral edge 22 of the gear housing 19 to retain packing material 26 therebetween.

It will be noted that the stud bolts 20 extend through the rectangular plate 23 of the gear housing 19 to engage the forwardly recessed boss 18 of the motor housing plate 16, thereby retaining the parts in assembled relation to confine the lubricants and the agitator operating instrumentalities as will appear more fully hereinafter. The gear housing 19 is, in this instance, provided with a pair of vertically aligned bores 27 and 28 extending through the forward wall thereof to communicate with inwardly countersunk recesses 29 and 30 that receive ball bearing raceways 31 and 32. The upper bore 27 is in axial alignment with the armature shaft bore 17' provided in the end motor casing plate wall 18 so as to support a beater or agitator shaft 33 that terminates in an integral gear 34 having an enlarged hub 35 for the reception of the armature shaft 15 therein. A pin 36 extends radially through the gear hub 35 to effect the connection thereof with the armature shaft 15 so as to rotate in unison therewith.

Another agitator shaft 37 is journalled in the lower gear housing bore 28 to receive a spur gear 38 corresponding in size and shape with the spur gear 34 for meshing alignment therewith within the gear housing 19. As shown, the lower spur gear 38 is provided with an enlarged hub 39 extending axially therefrom to the agitator shaft 37 proximate to the extremity 41 thereof. The agitator shaft extremity 41 is journalled in a ball bearing raceway 42 confined in a recess 43 provided in the end wall of the motor casing boss 18, thereby supporting the agitator shafts 33 and 37 in vertical spaced relation.

A converter housing 44 in this instance of substantially figure 8 design to avoid all dead space or ineffective mixing areas, is provided forwardly of the packing retainer plate 23 for attachment thereto. To this end, the converter housing 44 is provided wtih a peripheral flange 45 that has a finished end surface 46 to contact the finished face of the plate 23 for attachment thereto by means of threaded studs 47 which extend therethrough. Should commercial practice so dictate, the converter housing 44 may be formed integral with the retainer plate 23 so as to avoid the necessity of providing a threaded attachment therebetween through the medium of any fasteners 47. The forward wall 48 of the converter housing 44 is formed integral therewith to provide a discharge orifice 49 proximate to the bottom 50 of the converter housing 44 and substantially in axial alignment with the lower agitator shaft 37.

A closure plate 51 has a boss 52 formed thereon to enable the pivotal mounting thereof to the forward wall 48 by means of a stud 53 so as to afford the opening and closing thereof in the plane of the external surface of the forward converter wall 48. Another boss 54 is formed on the end of the closure plate 51 in substantially symmetrical arrangement with the opposite pivotal mounting boss 52 so as to provide for the formation of a handle member 55 thereon. The handle member 55 is preferably though not essentially formed integral with the closure plate 51 so as to enable the manual opening and closing thereof relative to a stop lug 56 comprising a part or attached to the forward mixer wall 48.

Figure 4:
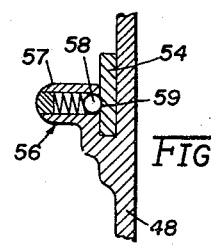
Figure 4 is a sectional view taken substantially along line IV—IV of Figure 3.

The closure stop 56 is preferably provided with a spaced lug 57 thereon for retaining a spring impelled detent 58 in the path of the ear 54 of the closure plate 51, the closure ear 54 being slightly indented as at 59 (Figure 4) so that the spring impelled detent 58 will register therewith in the operative position of the closure 51 over the discharge opening 49 of the mixer housing 44. In consequence thereof, the closure 51 serves as a valve for the discharge converter housing orifice 49. The substantially 8-shaped converter housing 44 is preferably provided with an intake hopper 60 that extends upwardly in the form of a hopper having a substantially rectangular configuration whose interior is sized to correspond with the configuration of the frozen substance 10 for reception therein. The converter housing 44 and the intake hopper 60 are preferably of comparatively thin sheet plate construction to minimize the heat capacity thereof and to provide better thermal conditions for the treatment of frozen substances which should lose the least possible cold thereto.

In the present embodiment, the intake hopper 60 extends upwardly and is somewhat larger in cross-section and longer than the predetermined size of the frozen substance unit 10 of preformed shape that is inserted therein for displacement into the interior of the converter housing 44 by means of a plunger 61 that is somewhat smaller in dimensional extent than the interior of the intake hopper 60, but corresponds in shape therewith so as to constitute a part of the closure member 62 adapted to rest upon the upper peripheral edge 63 of the intake hopper 60 to serve as a closure therefor. Any suitably shaped handle 64 may be formed with the top entrant closure plate 62 and, in the present embodiment, it is formed integral therewith through a connecting shank 65 so as to enable the manipulation of the closure 62 with its depending plunger extension 61. The plunger 61 may be of thin sheet plate construction to confine an antifreeze solution 61 therein to conduct heat to the exterior surface thereof and encourage the edible melted substances to be dislodged therefrom or it may be cast to form a hollow interior chamber having a curved sheet plate end 66 to absorb minimum refrigeration. The plunger is sufficiently heavy to be self-feeding or constitute a gravity feed for the refrigerated unit 10 when the agitators 67 and 68 are operating.

The lower end 66 of the depending plunger 61 is of arcuately concave shape so as to correspond with the exterior contour of a top converter member 67 mounted on the shaft 33 within the converter housing 44, thereby affording a minute clearance therewith when its top closure plate 62 rests upon the peripheral edge 63 of the charging hopper 60 (Figure 6). It will thus be apparent that the preformed self-sustaining and form-retaining frozen substance unit can be inserted by the fountain attendant within the hopper 60 for displacement into the converter housing 44 by means of the plunger 61 that forces the frozen substance into the path of the top sharp comminuting member 67 that cooperates with a lower agitator member 68 corresponding in general contour with the sharp-edged member 67 as will appear more fully hereinafter.

In order to effectively and more speedily convert the frozen self-sustaining and form-retaining edible unit 10 into a flowable plastic mass without impairment to the overrun therein and advantageously impart a somewhat increased overrun, if varied at all, the upper converter 67 and the lower agitator or beater 68 are helicularly shaped. The top converter member 67 comprises two blades 69 and 70 shaped substantially in the form of a helix to comprise circumferentially spaced cutters. In the present embodiment, the upper converter member 67 has its blades 69 and 70 of helicial shape secured to vertical end members 71 and 72 provided with tubular aligned bosses 73 and 74 which are sized to fit over the agitator shaft 33 for attachment thereto in any suitable manner.

The blades 69 and 70 of the agitator 67 are shaped to provide right-hand helixes spaced substantially 180° apart for permanent attachment to the vertical end members 71 and 72. The helicular blades 69 and 70 may and, in the embodiment shown in Figures 5 and 6 are provided with a compound reverse curve to present a substantially S cross-section with the outer edges 76 and 77 ground or otherwise shaped to present knife sharpness for effectively cutting and rapidly comminuting the edible frozen substances which preferably though not essentially is initially in a frozen solid state 10. The lower agitator or beater 68 is shaped to correspond with the upper agitator 67 with the exception that the helicular curve of the blades 78 and 79 are left-handed in direction to enable the interpositioning thereof with the upper blades 69 and 70 (Figure 6) to minimize the space requirements therefor as well as to more effectively comminute, mix, agitate, beat and convert the initially solid substance with which the converter housing 44 is charged, into a substantially plastic state. The cooperation of the plunger 61 with the sharp edged upper comminuting member 67, is effective in rapidly effecting the conversion with the minimum refrigeration loss.

In the lower beater or agitator 68, the forward edge 80 and 81 of the blades 78 and 79 are comparatively blunt so as to effectively agitate and beat the substance in cooperation with the upper comminuter or converter member 67. To reduce the metallic body of the hopper 60 and converter housing 44, these parts are formed of sheet material so as to eliminate or at least minimize the cold absorption from the edible substance 10. To this end, the converter housing 44 is provided with comparatively thin walls that tend to approach each other between the upper and lower agitator shafts 33 and 37 to provide substantially V-shaped horizontally confronting intermediate sections 82 and 83 (Figure 6) presenting a substantially "figure 8" shape that does not present any dead areas from a mixing standpoint.

In consequence thereof, the upper and lower portions of the converter housing 44 conform substantially with the generally circular contour of the upper and lower comminuter beaters 67—68, respectively, so as to effectively produce a homogeneous flowable plastic mass having proper overrun therein and the desired uniform smooth texture. This is effected within a short interval of as low as six seconds so that the resulting product will be cold and yet flowable for discharge responsive to the influence of the lower agitator or beater 68 into a receptacle such as a glass for consumption with the aid of a utensil such as a spoon. To procure the desired overrun in the converted substance, the blades 69—70 and 78—79 of the members 67 and 68, respectively, should be spaced from the walls of the housing 44 for at least $\frac{1}{32}$ to $\frac{1}{16}$ of an inch depending upon the size, capacity and speed of these instrumentalities.

The frozen self-sustaining and form-retaining unit 10 is purposely converted into a cold flowable plastic mass rather than a liquid in order to retain the desired overrun of at least seventy per cent and to enable the consumption with a spoon and to provide a more delectable product from a consumption standpoint. The lower agitator or beater 68 is provided with axially tubular bosses 84 and 85 for attachment to the lower agitator shaft 37 in any suitable manner. Any suitable shell 87 preferably of ornamental design and appearance may be provided as a complement of the base 11 to enclose the instrumentalities described supra with the exception of the entrant hopper 60 and the valve discharge orifice 49 and their auxiliary parts.

Suitable louvres 88 are preferably provided in the walls of the casing 87 for ventilation purposes and similarly the end motor casing member 16 may be provided with ventilating apertures 89 and 90. In order to automatically control the operation of the electric motor and to insure uniform results without relying upon the judgment of the attendant, and electric manual switch 91 of a self-opening spring type is mounted in the wall of the housing 87 so as to initiate the operation of the motor 12 and control the source of power thereto when the hopper 60 has been charged with the plastic substance so as to start with a full load. In consequence thereof, the current drain on the motor 12 will be extremely high and perhaps constitute a momentary overload so as to energize a single throw relay switch 92 connected to the power line 105 and the switch 91 to close the circuit to the electric motor 12 after the self-opening switch 91 has been released by the attendant.

The relay 92 is provided with a coil designed to pull its armature at a full load that will average or approximate 900 watts for a quarter horse power motor 12 operating at substantially 1750 R. P. M. This load continues until the refrigerated mass 10 has been fully comminuted by the upper rotating member 67 for transmission to the lower agitator beater 68 to effect the conversion thereof into the desired plastic consistency at which time the motor 12 has a power drain of substantially 300 watts for a 110 volt A. C. motor. At this moment when the consistency of the initial plastic mass 10 is reduced to a plastic state at the desired overrun, the relay coil 92 is such as to release an armature at this current drain so as to break the circuit which is clearly illustrated and described in the copending application serially numbered 381,726 and filed March 4, 1941. Opening the circuit de-energizes the motor 12, thereby indicating when the initial refrigerated mass 10 has been converted to its proper plastic consistency through this automatic motor control.

Figure 3:
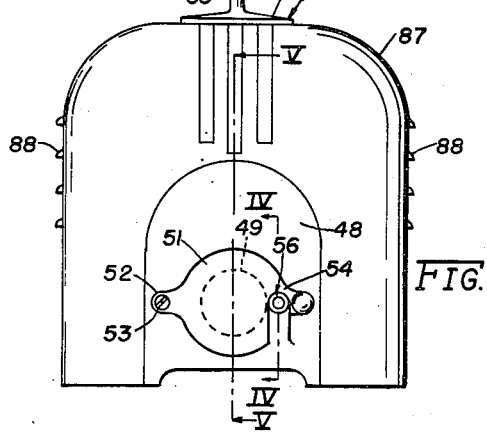
Figure 3 is a plan view in elevation of the device shown in Figures 1 and 2.

In order to effect the discharge of the plastic substances after the motor 12 has become de-energized, another switch 102 having a resiliently mounted pole 103 thereon (Figure 1) is connected to the power line 104—105 to cut in the motor 12 responsive to opening the valve 51. The valve 51 is opened by displacement in a counterclockwise direction (viewed from Figure 3) in conjunction with its mounting pintle 53. It is to be noted the valve pintle 53 is provided with a trip 106 which is rotated with the pintle 53 and valve 51 in the path of the resiliently mounted switch pole 103 so as to open the switch 102 when the valve 51 is disposed over the discharge opening 49. When the valve 51 is displaced from the discharge housing opening 49, however, the circuit is closed ahead of the manual switch 91 and relay switch 92, thereby enabling the discharge of the plastic mass 10 after it has been properly converted to the desired consistency for discharge into a receptacle such as a glass, ice cream cone, or other type of container responsive to the action of the lower agitator member 68.

The switch 102 has one of its terminals connected to a power line extension that is electrically connected to one of the terminals of the motor 12, and the main wire line 104 is connected to the other terminal thereof. Now, then, in order to preclude the motor 12 to be energized when the plunger 61 has been removed and thus permit the attendant to accidentally lodge his fingers in the hopper 60 for possible serious injury responsive to the rotation of the comminuting and agitator members 67—68, a switch button 107 is carried by a resilient strap 108 to normally project the button 107 through an aperture 109 provided in the rear wall of the hopper 60 near the open orifice 63 thereof.

The switch terminal button 107 is disposed in the path of the plunger 61 so as to be displaced outwardly when the plunger 61 is positioned to close the open end 63 of the hopper 60 in forcing the edible refrigerated unit 10 downwardly into the path of the rotating comminuter 67. When the switch button 107 is displaced, a terminal contact 110 carried by the strap 108 will effect engagement with a confronting terminal contact 111 carried by a resilient strap 112 (Figure 5) that is disposed parallel to the strap 108. Lead wires 113—113' connect the contact terminal straps 108—112 with the main wire lead 105 so as to close this lead wire when the plunger 61 is in operative position to enclose the open orifice 63 of the hopper 60. This insures against injury to the attendant's finger or hand in that the switch button 107 will protrude into the hopper 60 through the apertures 109 thereof so as to break the motor circuit through the terminal contacts 110—111 and preclude energization of the motor 12 in the event the plunger 61 is removed from the hopper 60 even though the manual switch 91 or valve switch 102 is closed by the attendant.

This insures the utmost safety in the operation of the instrumentalities described supra, and affords the automatic shut-off when the power has reduced to a predetermined limit calibrated and determined by the load on any particular motor 12 when the proper conversion of the mass 10 to the desired plastic consistency has been effected by the members 67 and 68. It is to be noted that a casing 114 is provided to enclose the terminal contacts 110—111 together with their supporting terminal straps 108—112, the casing 114 being detachably connected to the rear wall of the hopper 60 so as to enclose the switch 107 and preclude access of any foreign substances thereto. With this arrangement, the casing 114 with the contacts 110—111 and button 107 are readily removable as a unit to permit the hopper 60 to be separately removed and cleansed.

It is to be noted that the relay switch coil 92 is provided with an adjustable resistor element that enables a variation at which the relay switch 92 will cut-out the motor 12 depending upon the requirements of commercial practice and the particular substances that are being converted or processed in the manner described herein. This adjustment enables an attendant to uniformly produce the desired consistency even though there may be variations in compositions. It should be observed that the initial refrigerated edible substances 10 may be of any desired flavor and the proper proportion of flavor extracts and preferably fresh fruits such as strawberries, bananas, raspberries and other ingredients of this character included that are commonly found in frozen confections such as ice cream to afford the proper taste variations to meet all purchaser demands and individual taste requirements. This is provided for at the factory and each vendor can be supplied with a supply of properly varied and proportioned frozen units 10 for conversion into a plastic freeze upon customer demand with instrumentalities of the type described.

It should be noted that the placement of the refrigerated substance or predetermined mass 10 in the intake hopper 60 for the duration of its passage therethrough and into the conversion chamber 44, serves to conduct a portion of its refrigeration to the body of the hopper 60 and conversion chamber 44. The frequent processing of successive substance units 10 will gradually serve to refrigerate the interior end walls of the hopper 60 with its conversion chamber 44 so that the extent of the heat exchange will lessen and further processing will be more effective in stabilizing the resulting plastic product. With the temperature of the hopper 60 and its conversion chamber reduced to a degree nearing the temperature of the resultant plastic product, better control of the air overrun is possible and the discharge product becomes more stable and retains its plastic consistency sufficiently long the enable convenient and tasty consumption. The simultaneous comminution and agitation of the initial frozen units 10 is, therefore, gradually converted into a stable and delectable plastic mass of smooth texture and possessed of the desired air overrun therein. There is, in effect, a defreezing treatment imparted to the frozen units 10 in effecting the desired conversion thereof.

Various changes may be made in the embodiment of the invention herein specifically described without departing from or sacrificing any of the advantages of the invention or any features thereof, and nothing herein shall be construed as a limitation upon the invention, its concept or structural embodiment as to the whole or any part thereof except as defined in the appended claims.

I claim:

1. A method of treating normally liquid edible material frozen to a substantially solid state which consists in subjecting preformed units thereof to a comminuting and beating action until converted to a cold flowable plastic mass with the desired overrun therein, and then transferring the plastic mass substantially equivalent to an initial preformed unit into a receptacle for consumption in its cold plastic state.

2. A method of treating normally liquid edible substances frozen into polygonal units of preformed self-sustaining and form-retaining shape and possessed of any predetermined overrun which consists in subjecting each preformed unit to a cutting and beating action that first reduces and then increases the overrun during the conversion thereof to a cold flowable plastic state, and then transferring the cold plastic mass possessed of the desired overrun into a receptacle for consumption of the initial preformed solid unit in its cold plastic state.

3. A method of treating normally liquid edible material frozen into substantially solid preformed units of predetermined size, which consists in subjecting the frozen units to a beating action to reconvert such into substantially its initial state as a cold flowable plastic freeze having the desired overrun therein, and then transferring the plastic freeze into a receptacle for consumption of the initial preformed solid unit in its cold plastic state.

4. A method of processing normally liquid material frozen to a substantially solid state which consists in mechanically comminuting and agitating preformed units of the frozen material sufficiently to convert such into a plastic consistency without any substantial change in the general character of the resultant product to impart improved taste and texture qualities thereto, and then transferring each preformed unit of the plasticized material into a receptacle for consumption with the aid of a spoon.

5. A method of processing normally liquid material frozen to a substantially solid state which consists in mechanically comminuting and simultaneously agitating preformed units of the frozen material sufficiently to convert such into a plastic consistency with a predetermined overrun and without change in the general character of the resultant product to impart improved taste and texture qualities thereto, and then transferring the plasticized material into a receptacle for consumption with the aid of a spoon.

6. A method of processing normally liquid material frozen to a substantially solid state which consists in mechanically comminuting preformed units of frozen material sufficiently to convert such into a plastic emulsified consistency without any substantial variation in the initial overrun or change in the general character of the resultant product to impart improved taste and texture qualities thereto, and then transferring the preformed units of the plasticized material into a receptacle preparatory to consumption.

7. A method of treating a normally liquid edible substance frozen into a substantially solid preformed state which consists in confining the preformed substance in a chamber of greater capacity, then actively comminuting and beating the frozen substance in said chamber until it is converted into a uniform plastic consistency substantially filling the chamber without any substantial change in the general character of the resultant product to impart improved taste and texture qualities thereto, and then transferring the converted substance to a receptacle for serving in its plastic state.

8. A method of treating a normally liquid edible substance frozen into a substantially solid preformed shape which consists in actively beating the preformed substance sufficiently to convert such into a uniform plastic consistency having the desired overrun therein without any substantial change in the general character of the resultant product to impart improved taste and texture qualities thereto, and then transferring the converted substance into a receptacle for consumption of the initial preformed substance in its plastic state.

RUSSELL STOVER.